United States Patent
Lee et al.

(10) Patent No.: US 10,752,114 B2
(45) Date of Patent: Aug. 25, 2020

(54) MOTOR DRIVE CONTROL METHOD AND SYSTEM, AND METHOD OF CONTROLLING DRIVE OF AIR COMPRESSOR IN FUEL CELL SYSTEM USING THE SAME

(71) Applicants: HYUNDAI MOTOR COMPANY, Seoul (KR); KIA MOTORS CORPORATION, Seoul (KR)

(72) Inventors: Dong Hun Lee, Anyang-si (KR); Chang Seok You, Anyang-si (KR); Min Su Kang, Paju-si (KR); Sung Do Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 114 days.

(21) Appl. No.: 15/701,615

(22) Filed: Sep. 12, 2017

(65) Prior Publication Data

US 2018/0118032 A1 May 3, 2018

(30) Foreign Application Priority Data

Oct. 31, 2016 (KR) .................. 10-2016-0143494

(51) Int. Cl.
*G01R 31/34* (2020.01)
*B60L 1/00* (2006.01)
(Continued)

(52) U.S. Cl.
CPC ............... *B60L 1/003* (2013.01); *H02P 6/08* (2013.01); *H02P 21/06* (2013.01);
(Continued)

(58) Field of Classification Search
CPC ............. B60L 1/003; H02P 21/06; H02P 6/08
See application file for complete search history.

(56) References Cited

U.S. PATENT DOCUMENTS

| 6,448,724 B1 | 9/2002 | Kleinau et al. |
| 2002/0177932 A1* | 11/2002 | Kifuku ................ B62D 5/0481 |
| | | 701/41 |

(Continued)

FOREIGN PATENT DOCUMENTS

| EP | 2808994 A2 | 12/2014 |
| JP | 2005-073383 A | 3/2005 |

(Continued)

OTHER PUBLICATIONS

Korean Office Action dated Sep. 27, 2018 issued in Korean Patent Application No. 10-2016-0143494.

(Continued)

*Primary Examiner* — Muhammad S Islam
(74) *Attorney, Agent, or Firm* — Morgan, Lewis & Bockius LLP

(57) ABSTRACT

A motor drive control method is provided for controlling a speed of a motor such that a measured speed value of the motor follows a speed command value. The motor drive control method includes an on/off driving operation of driving a torque of the motor based on the speed command value in such a way that the torque of the motor is repeatedly turned on/off on preset cycle and duty. The motor drive control method and system can markedly enhance efficiency of a motor by reducing switching loss and current ripple loss of an inverter in a low-speed driving period of a high-speed motor.

14 Claims, 5 Drawing Sheets

(51) Int. Cl.
    *H02P 6/08*     (2016.01)
    *H02P 21/06*     (2016.01)
    *H01M 8/04119*     (2016.01)
    *H01M 8/04492*     (2016.01)
    *H01M 8/04858*     (2016.01)

(52) U.S. Cl.
    CPC .... *H01M 8/04126* (2013.01); *H01M 8/04507* (2013.01); *H01M 8/04888* (2013.01); *H01M 8/04917* (2013.01); *Y02T 10/7258* (2013.01)

(56) References Cited

U.S. PATENT DOCUMENTS

| | | | |
|---|---|---|---|
| 2006/0197482 | A1 | 9/2006 | Harwood |
| 2009/0243522 | A1* | 10/2009 | Suhama ................ B60L 7/16 318/376 |
| 2013/0082634 | A1 | 4/2013 | Bokusky et al. |
| 2013/0187588 | A1* | 7/2013 | Nakata ................ H02P 27/06 318/430 |
| 2015/0349675 | A1* | 12/2015 | Lee ....................... H02P 6/34 318/400.06 |
| 2015/0365032 | A1* | 12/2015 | Katsumata ........... H02P 21/141 318/802 |
| 2016/0138600 | A1 | 5/2016 | Oda et al. |
| 2016/0197482 | A1 | 7/2016 | Varma et al. |

FOREIGN PATENT DOCUMENTS

| | | |
|---|---|---|
| JP | 2010-221856 A | 10/2010 |
| KR | 10-2013-0069000 A | 6/2013 |
| KR | 10-2013-0103371 A | 9/2013 |
| KR | 10-2014-0073735 A | 6/2014 |
| KR | 10-2015-0026265 A | 3/2015 |
| KR | 2016-0024963 A | 3/2016 |
| KR | 10-2016-0065618 A | 6/2016 |
| KR | 10-2016-0110621 A | 9/2016 |
| WO | 2011-044121 A1 | 4/2011 |

OTHER PUBLICATIONS

Korean Office Action dated Mar. 30, 2018 issued in Korean Patent Application No. 10-2016-0143494.
Extended European Search Report dated Feb. 23, 2018 issued in European Patent Application No. 17191818.8.

* cited by examiner

MOTOR DRIVE CONTROL METHOD AND SYSTEM, AND METHOD OF CONTROLLING DRIVE OF AIR COMPRESSOR IN FUEL CELL SYSTEM USING THE SAME

CROSS REFERENCE TO RELATED APPLICATION

The present application is based on and claims the benefit of priority to Korean Patent Application No. 10-2016-0143494 filed on Oct. 31, 2016 with the Korean Intellectual Property Office, the entire contents of which are incorporated herein for all purposes by this reference.

TECHNICAL FIELD

The present disclosure relates to motor drive control method and system and a method of controlling the drive of an air compressor in a fuel cell system using the same, and more particularly to motor drive control method and system which can reduce a switching loss and current ripple loss of an inverter in a low-speed drive period of a high-speed motor, thus improving efficiency of the motor.

BACKGROUND

In fuel cell vehicles, under driving conditions in which cooling performance is reduced, for example, when a fuel cell stack is operated with high output, e.g., during a high-temperature climbing driving process, the driving temperature of the fuel cell stack is increased, and the humidity of supply fuel is reduced. Thereby, the fuel cell stack is dried, so that the driving voltage of the stack is reduced under the same current conditions. In this case, a vicious cycle may be caused, in which a heat generation rate of the fuel cell stack is increased by a stack voltage drop, and therefore the driving temperature of the fuel cell is further increased.

To prevent such a vicious cycle of an increase of the fuel cell driving temperature, recent fuel cell systems for vehicles are employing a control technique of increasing the pressure of air to be supplied to a cathode and increasing relative humidity of the cathode side. Given this, there is a need for further increasing a compression ratio of an air compressor which supplies air to the cathode side of the fuel cell stack.

Due to the necessity of further increasing the compression ratio of air to be supplied to the cathode side of the fuel cell stack, an air compressor has been designed such that the compression ratio of the air compressor is increased, and the maximum efficiency is obtained at the maximum pressure driving point. However, although this design can increase efficiency of the compressor in a high flow rate and high compression ratio period, the efficiency of the compressor is comparatively reduced in a low flow rate period. Therefore, in the low flow rate period which is a main driving region under urban driving conditions, the power consumption of the air compressor is increased, and therefore fuel efficiency of the vehicle deteriorates.

In more detail, a pressurizing air compressor having a further increased air compression ratio compared to that of an atmospheric air blower must be configured such that a range of the driving speed of a motor installed thereof is further increased. Accordingly, a difference in the driving speed of the motor between a low flow rate period and a high flow rate period is increased. Therefore, there is a disadvantage in that it is difficult to improve efficiency of the air compressor. That is, in the pressurizing air compressor, as a rotating speed of the motor is increased, a motor inductance is reduced to secure a sufficient voltage margin in a high-speed driving period. Due to the reduction of the motor inductance, three-phase ripple current is increased, and efficiency of the motor/inverter is thus reduced. Particularly, in a low flow rate period in which comparatively low output is required, the three-phase current is small, and efficiency reduction effect is markedly increased due to an increase in a current ripple. That is, three-phase ripple current is a secondary component which does not contribute to the motor torque. Thus, in the low flow rate period having a low motor torque, three-phase ripple current is increased compared to a three-phase sine wave current component, so that the motor/inverter efficiency is reduced compared to that of the high-output period.

Furthermore, to secure high-speed rotation of the motor of the air compressor, an airfoil bearing is used. The airfoil bearing must be rotated at a predetermined speed or more so as to maintain the bearing in a lifted state. Therefore, if the motor is continuously operated at a speed lower than the reference speed over which the airfoil bearing can be maintained in the lifted state, the airfoil bearing may be damaged by friction with a rotating shaft of the motor. Thus, to prevent the airfoil bearing, the air compressor is configured such that the minimum driving speed is limited to a predetermined value or more. Consequently, even when the fuel cell must be operated with low output, the air compressor is operated at speeds higher than the minimum driving speed. Thereby, air is unnecessarily supercharged, thereby reducing efficiency of the entire fuel cell system.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose motor drive control method and system which can markedly enhance the efficiency of a motor by reducing switching loss and current ripple loss of an inverter even when a motor, designed such that the maximum efficiency is generated when it rotates at a high speed, is operated at a low speed, and a method of controlling the drive of a compressor in a fuel cell system using the motor drive control method and system.

According to one aspect, a motor drive control method for controlling a speed of a motor such that a measured speed value of the motor follows a speed command value includes: an on/off driving operation of driving a torque of the motor based on the speed command value such that the torque of the motor is repeatedly turned on/off on preset cycle and duty.

The on/off driving operation may include controlling a drive current such that, when the torque of the motor is in an on state, the drive current is applied to the motor, and when the torque of the motor is in an off state, the drive current to be applied to the motor is substantially zero.

The on/off driving operation may include turning off a switching element included in an inverter for providing the drive current to the motor when the torque of the motor is in the off state.

The on/off driving operation may include controlling an on/off duty of a switching element included in the inverter such that a level of a drive voltage to be applied to the motor is substantially equal to a level of counter electro-motive force of the motor when the torque of the motor is in the off state.

The motor drive control method may further include, before the on/off driving operation, determining a current command value for a drive current for driving the motor such that the measured speed value follows the speed command value; and determining a voltage command value for driving the motor such that an actual drive current to be provided to the motor follows the current command value.

The determining of the voltage command value may include determining the voltage command value using a control technique including a process of integrating errors between a measured drive current value of the motor and the current command value.

The determining of the voltage command value may include interrupting the process of integrating errors between the measured drive current value and the current command value, when the torque of the motor is in the off state in the on/off driving operation.

The determining of the current command value may include determining the current command value as zero when the torque of the motor is in the off state in the on/off driving operation.

When the speed command value and the current command value are within a preset range, the on/off driving operation may be performed.

In a case where the speed command value or the current command value is out of a preset range, the torque of the motor may be always in an on state.

The case where the speed command value or the current command value is out of the preset range may include a case where the motor performs a regenerative braking operation.

According to another aspect, a motor drive control system includes: a speed controller for determining a current command value for a drive current for driving a motor such that a measured speed value of the motor follows a speed command value for the motor; a current controller for determining a voltage command value for driving the motor such that a measured motor drive current value of the inverter to be provided to the motor follows the current command value; a voltage output converter for converting the voltage command value and determine a duty of a switching element included in the inverter; and a torque on/off determination controller for controlling the voltage output converter such that a torque of the motor is repeatedly turned on/off on preset cycle and duty.

When the torque on/off determination controller instructs the torque of the motor to be repeatedly turned on/off, the voltage output converter may determine the duty of the switching element of the inverter such that the switching element is opened while the torque of the motor is in an off state.

When the torque on/off determination controller instructs the torque of the motor to be repeatedly turned on/off, the voltage output converter may determine an on/off duty of the switching element of the inverter such that a level of a drive voltage to be applied to the motor is substantially equal to a level of counter electro-motive force of the motor so that a drive current to be provided to the motor is substantially zero when the motor torque is in on an off state.

The current controller may determine the voltage command value using a control technique including a process of integrating errors between the measured drive current value and the current command value.

When the torque on/off determination controller instructs the torque of the motor to be repeatedly turned on/off, the current controller may interrupt the process of integrating the errors between the measured drive current value and the current command value when the torque of the motor is in the off state.

When the torque on/off determination controller instructs the torque of the motor to be repeatedly turned on/off, the speed controller may determine the current command value as zero while the torque of the motor is in the off state.

The torque on/off determination controller may control the voltage output converter such that the torque of the motor is repeatedly turned on/off in a case where the speed command value and the current command value is within a preset range.

The torque on/off determination controller may control the voltage output converter such that the torque of the motor is always in an on state in a case where the speed command value or the current command value is out of a preset range.

The case where the current command value is out of the preset range may include a case where the motor performs a regenerative braking operation.

According to a further aspect, a method of controlling drive of a motor in a compressor of a fuel cell system configured such that the compressor supplies compressed air to a fuel cell stack includes: generating a speed command value of the motor according to a required output of the fuel cell stack; generating a current command value for a drive current for driving the motor such that a measured RPM value of the motor follows the speed command value; and an on/off driving operation of controlling a torque of the motor based on the current command value in such a way that the torque of the motor is repeatedly turned on/off on preset cycle and duty.

The on/off driving operation may include, when the torque of the motor is in an off state, an operation of opening a switching element included in an inverter for providing a drive current and a drive voltage to the motor, or on/off-controlling the switching element such that a level of the drive voltage is substantially equal to a level of counter electro-motive force of the motor.

According to the motor drive control method and system, and the method of controlling the drive of a compressor in a fuel cell system using the same, the power consumption of a motor can be reduced, whereby the efficiency of a system to which the motor is applied can be enhanced. Particularly, in a fuel cell vehicle including the air compressor with the motor, the efficiency of the fuel cell system and the fuel efficiency of the vehicle can be enhanced by a reduction in power consumption of the air compressor.

Furthermore, in the motor drive control method and system and a method of controlling the drive of the compressor in a fuel cell system using the same, additional production cost is not required because the system does not need a separate hardware. The power consumption of the motor can be easily reduced only by on/off-controlling the motor torque in a certain speed period or a certain torque period.

According to the motor drive control method and system and the method of controlling the drive of the compressor in the fuel cell system using the same, the efficiency is improved not only in a normal speed drive state of the motor but also in an acceleration or deceleration drive state.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, motor drive control method and system, and a method of controlling driving of a compressor in a fuel cell system using the same according to various embodiments of the present disclosure will be described in detail with reference to the attached drawings.

Figure 1:
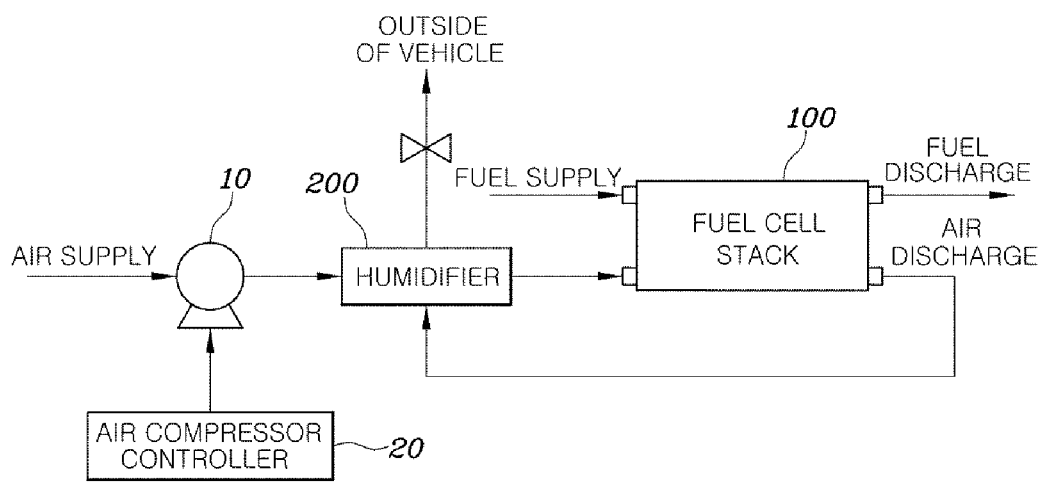
FIG. 1 is a block diagram illustrating an example of a fuel cell system to which a motor drive control method according to an embodiment of the present disclosure is applied.

FIG. 1 is a block diagram illustrating an example of a fuel cell system to which a motor drive control method according to an embodiment of the present disclosure is applied.

As shown in FIG. 1, the fuel cell system includes: a fuel cell stack 100 which includes a fuel cell configured to receive hydrogen as fuel, and air as an oxidizer, and generate power through an oxidation/reduction process; an air compressor 10 which supplies compressed air to a cathode of the fuel cell stack 100; and a humidifier 200 which supplies water to compressed air provided from the air compressor 10 and transfers the compressed air with water to the fuel cell stack 100. The humidifier 200 receives high-humidity nonreactive air discharged from the fuel cell stack 100 and supplies water to air to be supplied to the fuel cell stack 100.

As described in the description of the related art, when high output is required from the fuel cell stack 100, a compression ratio of air to be supplied to the fuel cell stack 100 is increased so as to prevent hydrogen from being dried by heat generation of the fuel cell stack 100. That is, the flow rate of air is increased by operating the air compressor 10 at higher speed. Thereby, the rate at which humidified air is supplied to the fuel cell stack 100 is increased. As a result, a dry phenomenon is mitigated.

To embody such an operation of controlling the air compressor 10, the fuel cell system may be provided with a controller 20 for controlling the air compressor 10, in more detail, a motor included in the air compressor 10.

In the following description of various embodiments of the present disclosure, a motor control method to be embodied in the controller 20 for controlling the motor of the air compressor 10 included in the fuel cell system, and a motor control system including the air compressor 10 and the controller 20 will be introduced as application examples. However, such application examples do not limit the present disclosure to the air compressor 10 of the fuel cell system, and the present disclosure may be extensively applied to techniques for controlling various motors used in other technical fields as well as a fuel cell field.

Figure 2:
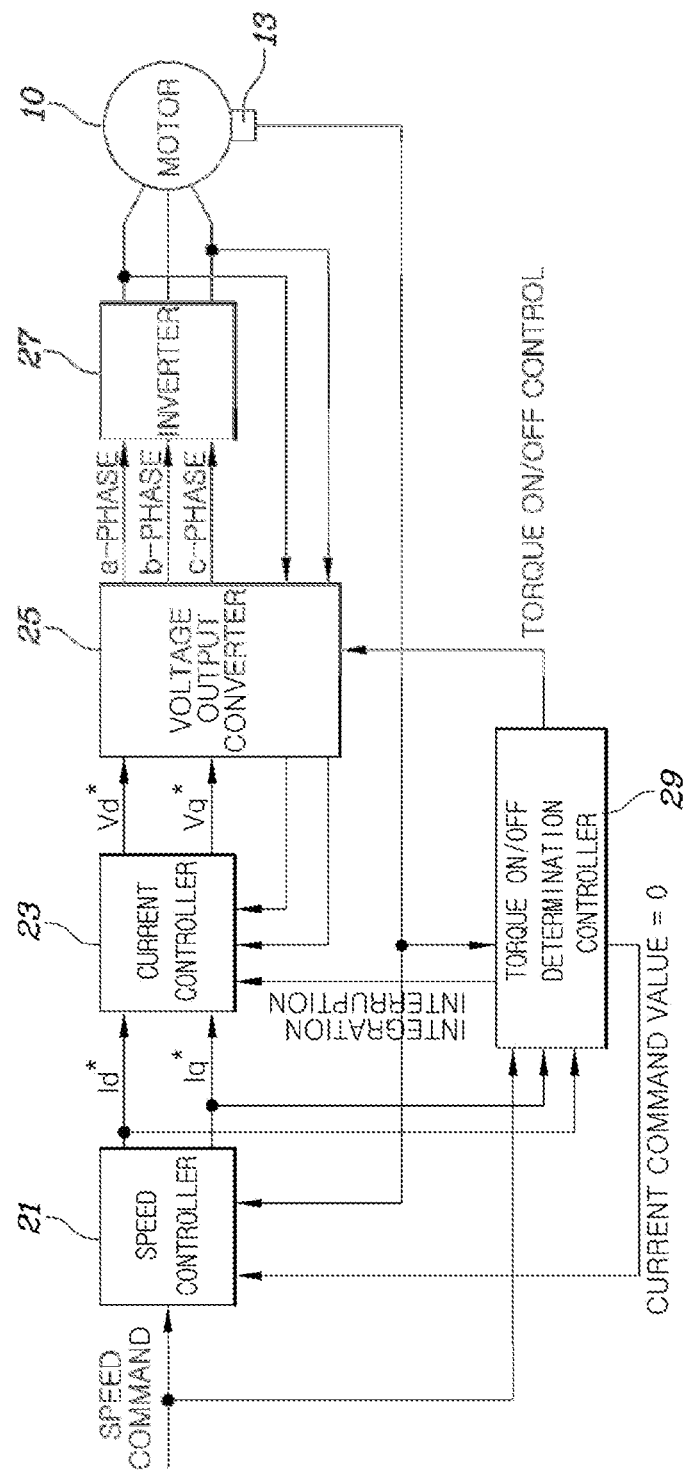
FIG. 2 is a block diagram illustrating a motor drive control system according to an embodiment of the present disclosure.

FIG. 2 is a block diagram illustrating a motor drive control system according to an embodiment of the present disclosure.

Referring to FIG. 2, the motor drive control method according to the embodiment of the present disclosure may include a speed controller 21, a current controller 23, a voltage output converter 25, an inverter 27, and a torque on/off determination controller 29. In FIG. 2, the motor is designated by reference numeral 10 equal to that of the air compressor of FIG. 1. The reason for this is because of the fact that, since various embodiments of the present disclosure are related to techniques for controlling the operation of a motor, particularly, in the fuel cell system, to techniques for controlling the operation of a motor included in an air compressor, the words "controlling the air compressor" can be construed as having the substantially same meaning as the words "controlling the motor of the air compressor". Furthermore, in this specification, the words "controlling the air compressor" may be construed as meaning "controlling the motor of the air compressor".

Each of the speed controller 21, current controller 23, and torque on/off determination controller 29 is an electric circuitry that executes instructions of software which thereby performs various functions described hereinafter.

The speed controller 21 receives, a superordinate controller (not shown), a speed command for controlling the speed of the motor, and generates and outputs current command values Id* and Iq* for drive current for driving the motor based on a measured motor speed value that is obtained by actually measuring the speed of the motor. In this regard, the superordinate controller may be a controller for controlling the fuel cell system or a vehicle controller for controlling a vehicle to which the fuel cell system is applied. The superordinate controller may determine the output of the fuel cell stack 100 based on the speed of the vehicle, a climbing angle, the degree of opening of an accelerator which is manipulated by a driver, and so forth, and determine the RPM of the motor of the air compressor 10, taking into account the output, temperature, etc. of the fuel cell stack 100. The superordinate controller provides a determined RPM of the motor to the speed controller 21 in the form of a speed command value. The speed controller 21 compares the received speed command value with the measured motor speed value corresponding to an actual RPM of the motor, and generates and outputs the current command values Id* and Iq* making the RPM of the motor follow the speed command value.

In this regard, the current command values Id* and Iq* are command values for drive current of the motor 10. Generally, in controlling the motor, a target torque of the motor is set, and the drive current of the motor is controlled such that the torque of the motor follows the target torque. Given the fact that the present disclosure is applied to controlling the speed of the motor, so as to control the motor such that the motor follows the speed command value that is a target speed, the speed controller 21 determines a target torque at which the measured speed value can follow the speed command value, based on the measured speed value and the speed command value, and then generates current command values corresponding to the target torque. In more detail, the current command values Id* and Iq* outputted from the speed controller 21 may be D-axis and Q-axis current command values of the motor.

The speed controller 21 may employ a control technique of accumulating values obtained through the integration of errors between command values and measured values in the same manner as that of a typical proportional integral (PI) controller, and reflecting the obtained values to a controlled variable. That is, the speed controller 21 may employ a control technique of integrating errors between speed command values and actual RPM values of the motor 10 and reflecting the result of the integration. The speed controller 21 may use not only the PI control technique but also a technique such as a PID (Proportional Integral Differential) control technique, an IP (Integral Proportional) control technique, or an IP-PI combination control technique.

Meanwhile, the motor 10 is provided with a sensor 13 such as a hall sensor or a resolver for detecting the position of a rotor of the motor. The current command values can be generated by providing a measured speed value obtained by detecting the RPM of the motor 10 using the sensor 13 to the speed controller 21.

The current controller 23 performs a control operation such that current to be applied from the inverter 27 to the motor follows the current command values Id* and Iq*, and thus outputs D-axis and Q-axis voltage command values Vd* and Vq*. The current controller 23 receives feedback on measured drive current values obtained by detecting some or all of the currents of respective phases supplied from the inverter 27 to the motor 10 and converting the detected currents into D-axis current and Q-axis current, and performs the control operation such that the measured current values follow the current command values, that is, the D-axis and Q-axis current command values Id* and Iq*.

In the same manner as the speed controller 21 described above, the current controller 23 may employ a control technique including an integral process, such as PI control, PID control, IP control, or IP-PI combination control, for accumulating errors between current command values Id* and Iq* and actual currents to be supplied from the inverter 27 to the motor.

The voltage output converter 25 converts the D-axis and Q-axis voltage command values Vd* and Vq* into three-phase voltage command values through coordinate conversion (DQ↔three phases (abc)). In addition, the voltage output converter 25 generates a drive signal for driving switching elements in the inverter 27, based on the converted three-phase voltage command values, and provides the drive signal to the inverter 27. The inverter 27 outputs three-phase current for driving the motor 10 while the switching operation of the switching elements in the inverter 27 is controlled by the drive signal.

The voltage output converter 25 may reconvert, into DQ currents, a value that is obtained by measuring three-phase drive currents of the inverter 27 to be fed back for the control operation to be performed in the current controller 21, and then provide it to the current controller 23.

The torque on/off determination controller 29 may determine a method of supplying the drive signal from the voltage output converter 25 to the inverter 27. In an embodiment of the present disclosure, the torque on/off determination controller 29 may control the voltage output converter 25 such that the torque of the motor 10 can be generated while it is repeatedly turned on/off on preset cycle and duty. Furthermore, in an embodiment of the operation of the torque on/off determination controller 29, the torque on/off determination controller 29 may control the voltage output converter 25 such that the speed command value to be provided to the speed controller 21 or the current command values Id* and Iq* generated from the speed controller 21 are inputted to the torque on/off determination controller 29, and if the speed command value and the current command values Id* and Iq* are within a preset range, the torque of the motor 10 are generated in a repeated on/off operation manner on the preset cycle and duty.

In the case where the torque on/off determination controller 29 has determined that the torque of the motor 10 must be generated in a repeated on/off operation manner, the result of the determination of the torque on/off determination controller 29 may be provided to the voltage output converter 25 and the current controller 23. The voltage output converter 25 that has received the result of the determination of the torque on/off determination controller 29 may provide, to the inverter 27, a signal for controlling the switching elements in the inverter 27 such that the motor 10 is repeatedly turned on/off. Furthermore, the current controller 23 that has received a command from the torque on/off determination controller 29 may be operated such that a control operation suitable for a torque off period is performed.

The above-mentioned contents related to the torque on/off control of the motor will be more clearly construed through the description of a motor drive control method according to an embodiment of the present disclosure.

Figure 3:
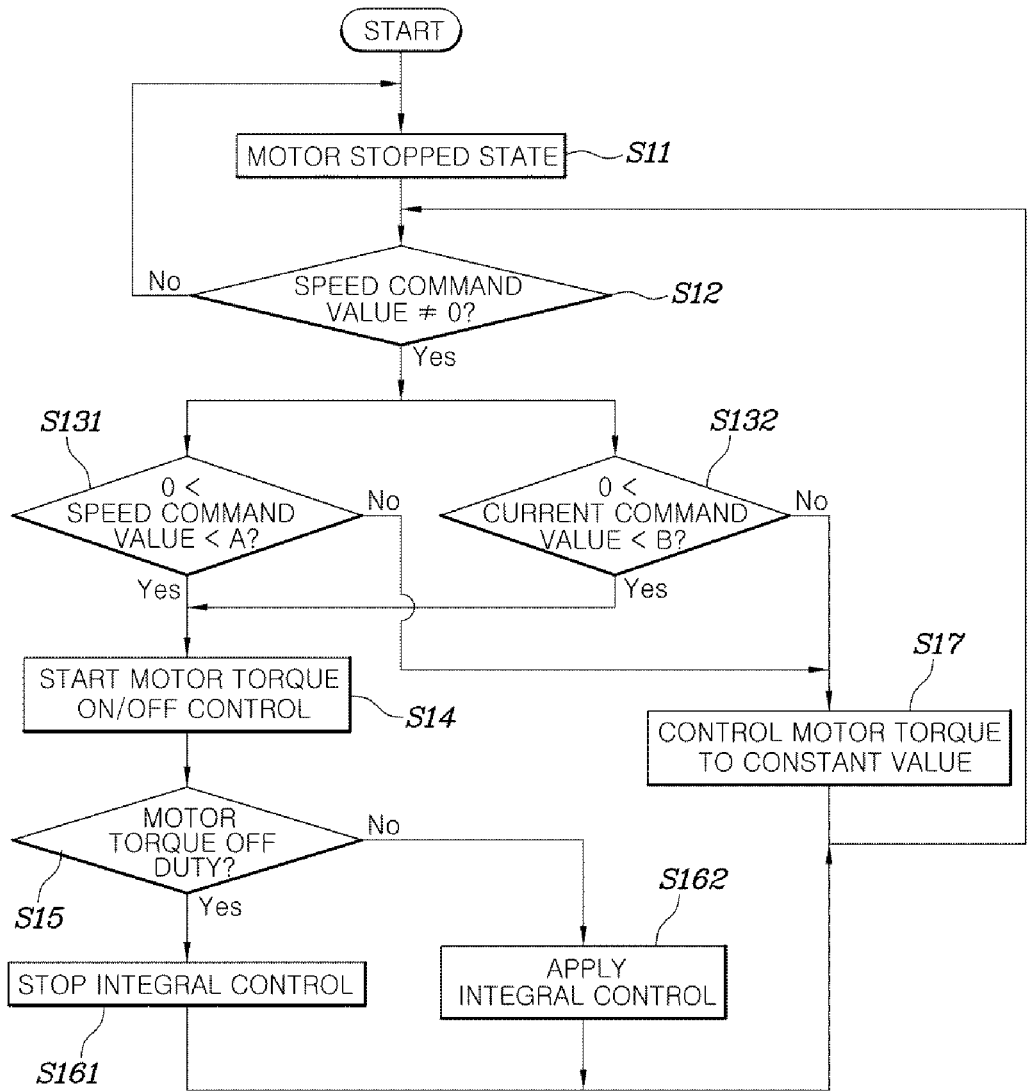
FIG. 3 is a flowchart showing a motor drive control method according to an embodiment of the present disclosure.

FIG. 3 is a flowchart showing the motor drive control method according to an embodiment of the present disclosure. The embodiment shown in FIG. 3 relates to an example of on/off controlling the torque of the motor when the speed command value of the motor or the current command values are within preset ranges. The characteristics of the present disclosure related to the technique of on/off controlling the torque of the motor are not limited to special conditions used in the example of FIG. 3, and the present disclosure may be applied to the operation of the motor regardless of the magnitudes of the speed command value or current command values.

Referring to FIG. 3, when the motor 10 is in a stopped state (at step S11), if a command value other than 0 is inputted to the speed controller 21 (at step S12), a control operation of generating the torque of the motor starts.

If the speed command value is inputted to the speed controller 21, the speed controller 21 calculates current command values Id* and Iq* for controlling the motor 10 such that the measured RPM value of the motor 10 follows the speed command value, and then outputs the current command values Id* and Iq* to the current controller 23. The current controller 23 calculates and outputs voltage command values Vd* and Vq* making measured current values follow the current command values Id* and Iq*, the measured current values corresponding to values obtained by directly measuring the drive current to be provided from the inverter 27 to the motor 10. The voltage output converter 25 converts the voltage command values Vd* and Vq* of the DQ coordinates into three-phase (a-phase, b-phase and c-phase) voltages, and generates a PWM switching signal for controlling the switching elements in the inverter to output each of the three-phase voltages and outputs the PWM switching signal to the inverter 27.

The operation of the motor starts through such a series of processes. In the motor drive control method according to the embodiment of the present disclosure, after the operation of the motor 10 has started, the torque on/off determination controller 29 monitors the speed command value or the current command values and determines whether to the torque on/off control operation (at steps S131 and S132). That is, the torque on/off determination controller 29 may determine to on/off control the torque of the motor when the speed command value is in the preset range (in FIG. 3, a range greater than 0 and less than A (a positive number)), at step S131, or the current command values are within the preset range (in FIG. 3, a range greater than 0 and less than B (a positive number)), at step S132. The above-mentioned ranges are preset ranges, taking into account the fact that the efficiency of the high-speed air compressor is rapidly reduced in a low-RPM or low-torque period, as described in the related art. However, in various embodiments of the present disclosure, the torque of the motor may be on/off-controlled in the entire torque and speed ranges in which the motor can be operated, regardless of the above-mentioned ranges.

If it is determined by the torque on/off determination controller 29 that the operation of on/off-controlling the torque of the motor must be performed, the torque on/off determination controller 29 instructs the voltage output converter 25 to output a drive signal for controlling on/off of the switching elements of the inverter 27 so as to perform the operation of on/off-controlling the motor torque.

Figure 4:
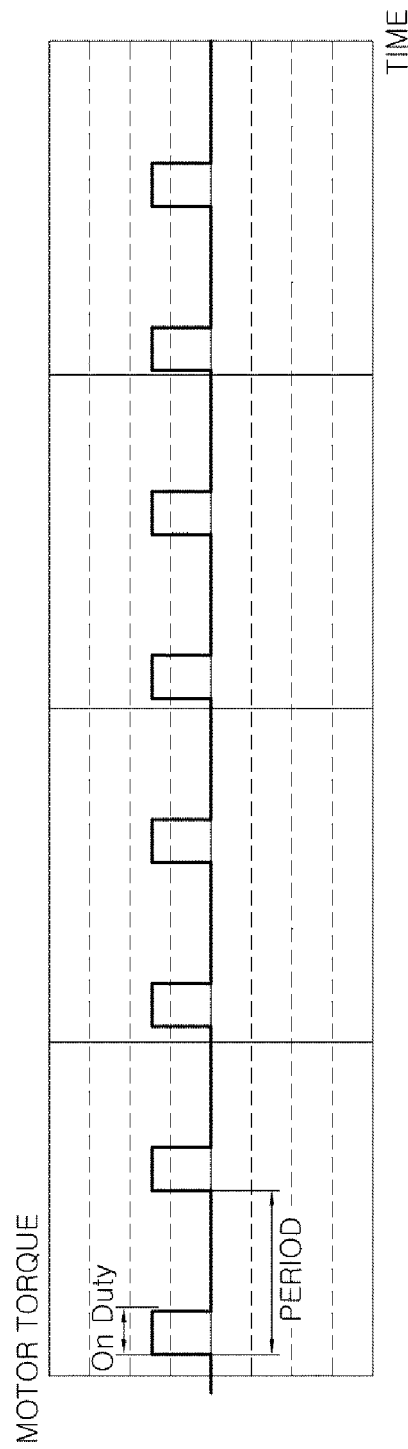
FIG. 4 is a graph showing a state of on/off controlling a motor torque in the control method according to an embodiment of the present disclosure.

FIG. 4 is a graph showing a state of on/off controlling the motor torque in the motor drive control method according to an embodiment of the present disclosure.

As shown in FIG. 4, at step S14 according to the embodiment of the present disclosure, the motor torque may be repeatedly turned on/off on the preset constant cycle and duty. In this regard, the on/off cycle and duty of the motor torque may be values, at which power consumption of the inverter by speeds of the motor can be minimized and the driving stability can be secured, and which is determined by an experimental method.

Even though a load affecting the motor 10 is low and thus the motor 10 is operated by inertia, it is preferable that the on/off repetition control for the motor torque be used under conditions of small variation in speed. In the case where the load of the motor 10 is large, because deceleration in the torque off period is greatly increased, acceleration and deceleration of the motor due to the repeated torque on/off operations are greatly increased, whereby unnecessary energy loss may be caused. Therefore, in the case where the load of the motor is comparatively large, the usefulness of the torque on/off repetition control is markedly reduced. Particularly, if acceleration and deceleration rates of the motor due to the torque on/off control exceed predetermined levels, rather, a problem of an increase in power consumption of the motor 10 may be caused.

Furthermore, the larger the rotational inertia momentum of the motor 10, the greater the effect of the motor torque on/off control. That is, in the case where the rotational inertial momentum of the motor 10 is large, variation in speed is small even in the torque off period, so that the efficiency of the torque on/off control can be increased.

In an example of a detailed technique of repeatedly on/off-controlling the motor torque, there may be used a method in which drive current to be applied to the motor is interrupted by making all of the switching elements included in the inverter 27 be in the off state (100% off duty) in a period in which the motor torque is set to the off state. That is, in a period in which the motor torque must be maintained in the on state, the voltage output converter 25 may output, to the inverter 27, a drive signal for controlling the switching elements of the inverter 27 in the same manner as that used for driving a typical motor. In a period in which the motor torque must be maintained in the off state, the voltage output converter 25 may output, to the inverter 27, a control signal for turning off all of the switching elements.

The inverter 27 that provides torque (drive current) for driving a three-phase motor may be generally embodied by a three-phase switching full bridge circuit using six switching elements (for example, IGBT (Insulated Gate Bipolar Transistor) and so forth). The current controller 23 calculates an error between the current command values and the measured motor drive current and outputs voltage command values (DQ coordinates) capable of reducing the error. The voltage output converter 25 converts the voltage command values to three-phase voltages, determines duties of the switching elements such that the converted three-phase voltages can be applied to the motor 10, and then on/off-controls the switching elements of the respective phases.

In the motor drive control method according to the embodiment of the present disclosure, the torque on/off control operation is performed in such a way that the torque of the motor is on/off-controlled on constant cycle and duty. In the period in which the torque is set to the on state, the typical operation of controlling the switching element is performed, as described above. In the period in which the torque is set to the off state, all of the inverter switching elements are turned off. In this way, the torque on/off control can be achieved.

In another method of controlling the switching elements of the inverter 27 in the period in which the torque is set to the off state, there may be used a method in which the switching elements of the respective phases in the inverter 27 are on/off-controlled such that drive voltage having the substantially same voltage level as counter electro-motive force generated in the motor 10 is generated. In the case where the counter electro-motive force of the motor 10 and the three-phase drive voltage of the inverter 27 are the same as each other, there is no potential difference. Therefore, a zero-current control state in which no current is provided from the inverter 27 to the motor 10 may be formed.

In the case where the on/off control for the motor torque is performed (at step S14), it is preferable that, in the period in which the motor torque is set to the off state (at step S15), the integral control that is performed by the current controller 23 be interrupted (at step S161). If the operation of integrating, by the current controller 23, errors between the command values and the measured values is allowed in the period in which the motor torque is in the off state, when the torque enters the on state again, a comparatively large output is applied from the controller due to the error integrated value, whereby instability of the system may be caused. In this case, because of fluctuation in the speed command vales and the current command values, rather, the effect of the torque on/off control may be markedly reduced. Of course, in the period in which the motor torque is set to the on state (at step S15), it is preferable that the integration control be performed by the current controller 23 (at step S162).

In another embodiment, in lieu of the method of interrupting the integral control of the current controller 23 in the motor torque off period, there may be used a method in which the speed controller 21 interrupts the entire control calculation when the motor torque is converted from the on state to the off state, and outputs the current command value as 0 in the motor torque off period. That is, three-phase output is interrupted by making the speed controller 21 output the current command as 0, whereby integration of errors between the current command values and the measured current values by the current controller 23 is interrupted in the motor torque off period in which neither torque nor output is generated. Therefore, the output can be prevented from excessively increasing due to accumulated errors at the time at which the motor torque returns to the on state. Of course, if the motor torque is re-changed from the off state to the on state, the typical calculation using the speed controller can resume. The calculation of the speed controller 21 is interrupted during the motor torque off period. Thus, when the motor torque is re-changed to the on state, the output on the speed controller 21 is maintained in an output value formed immediately before the motor torque is turned off. Therefore, the speed control stability can be secured without unnecessary acceleration or deceleration.

Meanwhile, in the case where the motor speed is out of a preset range or the current command value outputted from the current controller 23 is out of a preset range, the torque on/off determination controller 29 is operated such that the typical control method of determining the three-phase drive current of the inverter 27 according to the current command values without on/off-controlling the motor torque can be used (at step S17). The reason for this is because of the fact that, as described above, in the case where the speed of the motor 10 is a predetermined speed or more, the motor-side load torque is generally increased (for example, in the fuel cell system, when the speed of the motor is increased, the load torque of the air compressor is increased by an increase in flow rate and pressure), so that the amount of deceleration caused in the motor torque off period must be compensated for in the torque on period, whereby unnecessary acceleration or deceleration is required, and a loss related to this exceeds the switching loss and three-phase current ripple loss that are reduced by the torque on/off control. In the case where the current command value is a predetermined value or more, the system can be regarded as in a rapid acceleration period or in a high RPM state. Therefore, the efficiency of repeatedly on/off controlling the motor torque may be reduced, compared to that of the typical continuous torque application method.

In an example of the case where the current command value is out of the preset range, there may be the case where regenerative braking torque is applied to the motor. The case where regenerative braking torque is generated may be the case where torque is applied in a direction opposite to the rotating direction and be regarded as meaning the state in which the torque is negative. Therefore, at step S132 of FIG. 3, this case may be regarded as being the case where the current command value is out of the range greater than 0 and less than B (positive number). In the case where the motor decelerates and an regenerative braking operation is thus performed, it is also preferable that the on/off control of the motor torque be interrupted. The reason for this is because it is advantageous in terms of efficiency when energy is recovered through the continuous motor torque-on control operation in the regenerative braking state.

Figure 5:
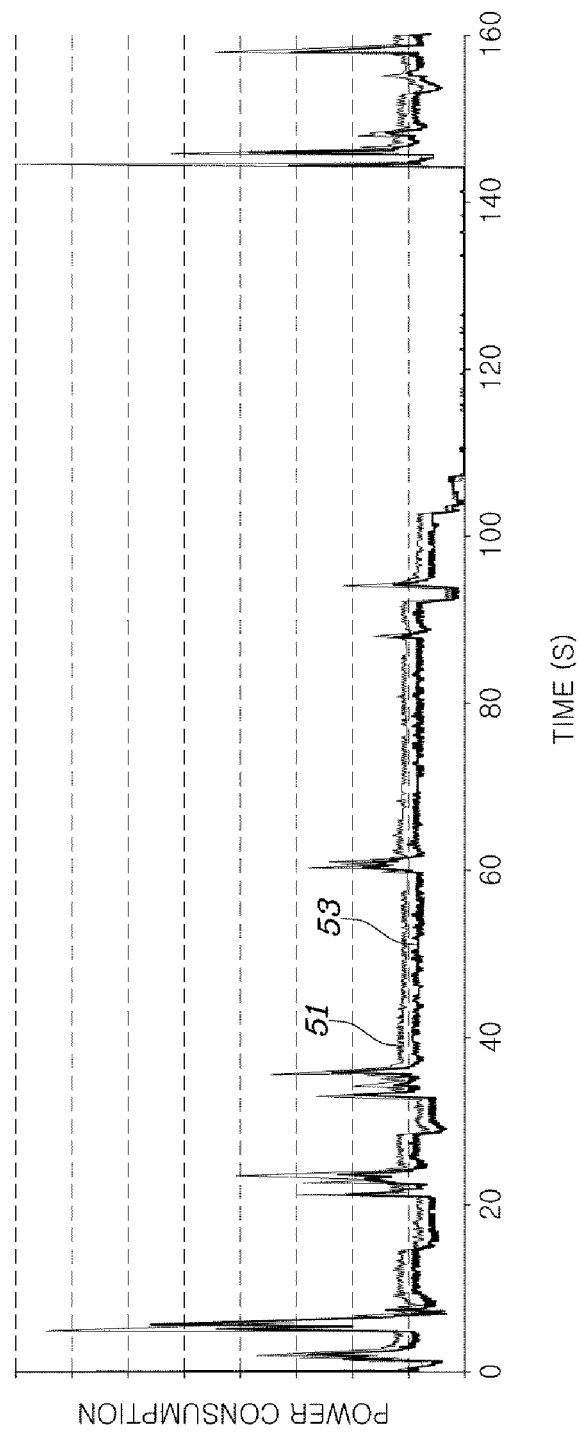
FIG. 5 is a graph comparing power consumption of the motor in the control method according to the embodiment of the present disclosure with power consumption of a motor in a conventional motor drive control method.

FIG. 5 is a graph comparing power consumption of the motor in the control method according to the embodiment of the present disclosure with power consumption of a motor in a conventional motor drive control method. Particularly, FIG. 5 shows the result of evaluation, in a UDDS (Urban Dynamometer Driving Schedule) mode, for an air compressor of a fuel cell system to which the motor drive control technology according to an embodiment of the present disclosure is applied.

As shown in FIG. 5, it can be construed that, in the case (53) which the motor torque on/off control technology that is the motor drive control method according to the embodiment of the present disclosure is used in the entire UDDS driving period, the power consumption is reduced compared to that of the case which the typical motor torque control technology is used.

As described above, motor drive control method and system according to various embodiments of the present disclosure can reduce the power consumption of a motor, thus enhancing the efficiency of a system to which the motor is applied. Particularly, in a fuel cell vehicle including the air compressor with the motor, the efficiency of the fuel cell system and the fuel efficiency of the vehicle can be enhanced by a reduction in power consumption of the air compressor.

Furthermore, in the motor drive control method and system according to various embodiments of the present disclosure, additional production cost is not required because the system does not need a separate hardware. The power consumption of the motor can be easily reduced only by on/off-controlling the motor torque in a certain speed period or a certain torque period.

In addition, as shown in FIG. 5, based on the UDDS mode driving, the effect of an improvement in efficiency can be obtained. Therefore, it can be construed that the efficiency is improved not only in a normal speed drive state of the motor but also in an acceleration or deceleration drive state.

Although embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A motor drive control method for controlling a speed of a motor such that a measured speed value of the motor follows a speed command value, the control method comprising:
    an on/off driving operation of driving a torque of the motor based on the speed command value such that the torque of the motor is repeatedly turned on/off on a preset cycle and duty to reduce a switching loss and current ripple loss of an inverter in a drive period of the motor,
    wherein the on/off driving operation comprises controlling a drive current such that, when the torque of the motor is in an on state, the drive current is applied to the motor, and when the torque of the motor is in an off state, the drive current applied to the motor is substantially zero, and
    wherein the on/off driving operation comprises turning off all of a plurality of switching elements included in the inverter for providing the drive current to the motor when the torque of the motor is in the off state.

2. The motor drive control method according to claim 1, further comprising, before the on/off driving operation,
    determining a current command value for a drive current for driving the motor such that the measured speed value follows the speed command value; and
    determining a voltage command value for driving the motor such that an actual drive current provided to the motor follows the current command value.

3. The motor drive control method according to claim 2, wherein the determining of the voltage command value comprises determining the voltage command value using a control technique including a process of integrating errors between a measured drive current value of the motor and the current command value.

4. The motor drive control method according to claim 2, wherein the determining of the current command value comprises determining the current command value as zero when the torque of the motor is in the off state in the on/off driving operation.

5. The motor drive control method according to claim 2, wherein, when the speed command value and the current command value are within a preset range, the on/off driving operation is performed.

6. The motor drive control method according to claim 2, wherein, in a case where the speed command value or the current command value is out of a preset range, the torque of the motor is always in an on state; and wherein the case where the speed command value or the current command value is out of the preset range includes a case where the motor performs a regenerative braking operation.

7. The motor drive control method according to claim 3, wherein the determining of the voltage command value comprises interrupting the process of integrating errors between the measured drive current value and the current command value, when the torque of the motor is in the off state in the on/off driving operation.

8. A motor drive control method for controlling a speed of a motor such that a measured speed value of the motor follows a speed command value, the control method comprising:
- an on/off driving operation of driving a torque of the motor based on the speed command value such that the torque of the motor is repeatedly turned on/off on a preset cycle and duty to reduce a switching loss and current ripple loss of an inverter in a drive period of the motor,
- wherein the on/off driving operation comprises controlling a drive current such that, when the torque of the motor is in an on state, the drive current is applied to the motor, and when the torque of the motor is in an off state, the drive current applied to the motor is substantially zero, and
- wherein the on/off driving operation comprises controlling an on/off duty of a switching element included in the inverter such that a level of a drive voltage applied to the motor is substantially equal to a level of counter electro-motive force of the motor when the torque of the motor is in the off state.

9. The motor drive control method according to claim 8, further comprising, before the on/off driving operation, determining a current command value for a drive current for driving the motor such that the measured speed value follows the speed command value; and
determining a voltage command value for driving the motor such that an actual drive current provided to the motor follows the current command value.

10. The motor drive control method according to claim 9, wherein the determining of the voltage command value comprises determining the voltage command value using a control technique including a process of integrating errors between a measured drive current value of the motor and the current command value.

11. The motor drive control method according to claim 9, wherein the determining of the current command value comprises determining the current command value as zero when the torque of the motor is in the off state in the on/off driving operation.

12. The motor drive control method according to claim 9, wherein, when the speed command value and the current command value are within a preset range, the on/off driving operation is performed.

13. The motor drive control method according to claim 9, wherein, in a case where the speed command value or the current command value is out of a preset range, the torque of the motor is always in an on state, and
wherein the case where the speed command value or the current command value is out of the preset range includes a case where the motor performs a regenerative braking operation.

14. The motor drive control method according to claim 10, wherein the determining of the voltage command value comprises interrupting the process of integrating errors between the measured drive current value and the current command value, when the torque of the motor is in the off state in the on/off driving operation.

* * * * *